(12) United States Patent
Murray et al.

(10) Patent No.: US 12,071,748 B2
(45) Date of Patent: Aug. 27, 2024

(54) ATMOSPHERIC WATER GENERATOR

(71) Applicant: CIRRUS REHOS RENEWABLE POWER AND WATER (PTY) LTD, Johannesburg (ZA)

(72) Inventors: Mike Murray, Johannesburg (ZA); Johan Adam Enslin, Johannesburg (ZA)

(73) Assignee: CIRRUS REHOS RENEWABLE POWER AND WATER (PTY) LTD, Johannesburg (ZA)

( * ) Notice: Subject to any disclaimer, the term of this patent is extended or adjusted under 35 U.S.C. 154(b) by 217 days.

(21) Appl. No.: 17/794,139

(22) PCT Filed: Jan. 20, 2021

(86) PCT No.: PCT/IB2021/050431
§ 371 (c)(1),
(2) Date: Jul. 20, 2022

(87) PCT Pub. No.: WO2021/148965
PCT Pub. Date: Jul. 29, 2021

(65) Prior Publication Data
US 2023/0052162 A1    Feb. 16, 2023

(30) Foreign Application Priority Data
Jan. 20, 2020   (ZA) ................... 2020/00358

(51) Int. Cl.
*E03B 3/28*        (2006.01)
*B01D 53/26*       (2006.01)
(Continued)

(52) U.S. Cl.
CPC .............. *E03B 3/28* (2013.01); *B01D 53/265* (2013.01); *F25B 15/04* (2013.01); *F25B 37/00* (2013.01)

(58) Field of Classification Search
CPC ....... E03B 3/28; B01D 53/265; B01D 5/0039; B01D 5/0051; B01D 5/0054; B01D 5/0003; F25B 15/04; F25B 37/00
See application file for complete search history.

(56) References Cited

U.S. PATENT DOCUMENTS

| | | |
|---|---|---|
| 5,106,512 A | 4/1992 | Reidy |
| 5,149,446 A | 9/1992 | Reidy |

(Continued)

FOREIGN PATENT DOCUMENTS

| | | | |
|---|---|---|---|
| WO | WO2008/031161 A1 | 3/2008 | |
| WO | WO-2008031161 A1 * | 3/2008 | ........... B01D 5/0006 |

(Continued)

*Primary Examiner* — Emmanuel E Duke
(74) *Attorney, Agent, or Firm* — Muncy, Geissler, Olds & Lowe, P.C.

(57) ABSTRACT

The invention relates to an atmospheric water generator that includes an absorption heat transformer (AHT) designed as a heat pump that is able to extract heat even from waste heat sources at or below ambient temperatures, with an evaporator working at a favourable design temperature (preferably between 2° C. and 15° C.) for chilled water supply to a cold coil that extracts atmospheric water from ambient air. The AHT employs a pseudo-isobaric temperature glide bubble reactor that contains a suitable binary liquid-vapour mixture in a density separation distillation environment, powered by a vapour absorption process.

17 Claims, 4 Drawing Sheets

(51) Int. Cl.
*F25B 15/04* (2006.01)
*F25B 37/00* (2006.01)

(56) References Cited

U.S. PATENT DOCUMENTS

| | | |
|---|---|---|
| 5,203,989 A | 4/1993 | Reidy |
| 5,553,459 A * | 9/1996 | Harrison .................. E03B 3/28 62/93 |
| 2009/0293724 A1* | 12/2009 | Ivison ...................... E03B 3/28 55/421 |
| 2012/0222437 A1* | 9/2012 | Merritt ................. B01D 5/0006 62/476 |

FOREIGN PATENT DOCUMENTS

| | | |
|---|---|---|
| WO | WO2010/142012 A1 | 12/2010 |
| WO | WO2013/026126 A1 | 2/2013 |
| WO | WO2013/084077 A1 | 6/2013 |
| WO | WO2018/069845 A1 | 4/2018 |

* cited by examiner

ATMOSPHERIC WATER GENERATOR

FIELD OF THE INVENTION

The invention relates to an atmospheric water generator (AWG) machine.

BACKGROUND TO THE INVENTION

The standard AWG machines employ a de-humidifying concept where atmospheric air is chilled to below dew point, condensing water from the air in a cold evaporator coil, after which the chilled air is used as coolant for the heat rejection at a hot condensing coil. A vapour compression (VC) refrigeration unit is coupled between the two coils to complete the AWG machine. The main operating cost of such an AWG unit is the cost of electricity required to power the refrigeration unit compressor. The price of water production (globally) varies to a significant degree. This can be attributed mainly to the cost of energy. The cost of providing municipal water calculated in energy terms can vary, for example, from about 12.5 Wh/L down to about 4.5 Wh/L depending on country and location. Desalination costs are being driven down due to new technologies and international competition. The operation costs of a standard AWG remain relatively high compared to municipal water supply and standard desalination machines.

OBJECT OF THE INVENTION

It is an object of the invention to provide an AWG machine that avoids the expense of employing a vapour compressor for more cost effective production of water.

SUMMARY OF THE INVENTION

In accordance with the invention, there is provided an atmospheric water generator (AWG) that includes:
- a cold coil for extraction of atmospheric water from air;
- a pseudo-isobaric temperature glide bubble reactor that contains a suitable binary liquid-vapour mixture in a density separation distillation environment, powered by a vapour absorption process;
- a source of water that is connected to an water chiller evaporator with a water chilling flow path on a first side of the water chiller evaporator that is isolated from and in thermal communication with a second side of the water chiller evaporator;
- a binary liquid-vapour mixture supply line from the bubble reactor connected through an evaporator pump to the second side of the water chiller evaporator for evaporation of the binary liquid-vapour mixture and thermal energy extraction from the water in the water chilling flow path;
- the water chilling flow path connected from the water chiller evaporator to the cold coil; and
- a binary liquid-vapour mixture return line from the second side of the water chiller evaporator connected to an absorber with a binary liquid-vapour mixture outlet connected back into the bubble reactor.

The invention further provides for an AWG as defined in which the binary liquid-vapour mixture return line from the second side of the water chiller evaporator is connected through a first inlet to the absorber and the bubble reactor is connected through an absorber circulation pump into a second inlet of the absorber.

The invention still further provides for an AWG as defined in which the density separation distillation in the bubble reactor is provided by:
  (a) gravitational force;
  (b) centrifugal forces generated in the binary liquid-vapour mixture; or
  (c) a combination of gravitational force and centrifugal forces generated in the binary liquid-vapour mixture.

Further features of the invention provide for an AWG as defined in which: a fan is arranged to move air from an ambient environment over the cold coil; the binary liquid-vapour mixture is an ammonia-water ($NH_3$-$H_2O$) mixture; the water source is a water reservoir connected through a circulation water pump to the water chilling flow path on a first side of the water chiller evaporator; water in the reservoir is at substantially ambient temperature.

Further features of the invention provide for an AWG as defined in which: the bubble reactor includes a subcooler chamber provided below the bubble reactor with binary liquid-vapour mixture in the subcooler chamber in contact with a cooling coil for heat removal and subcooling of the binary liquid-vapour mixture [to a temperature below a saturation level for the pressure in the bubble reactor]; water is pumped through the cooling coil of the subcooler chamber and from the cooling coil to an absorber coil in the absorber to exit the absorber as hot delivery water; a subcooled liquid component of the binary liquid-vapour mixture descends to a bottom of the subcooler chamber where a suction inlet of the absorber circulation pump draws subcooled liquid; subcooled liquid from the absorber circulation pump enters a mixing section of the absorber through a nozzle at the second inlet and vapour from the water chiller evaporator enters the mixing section through a vapour nozzle at the first inlet to form a mixed two-phase liquid-vapour flow column exchanging heat and mass as the vapour is absorbed in the subcooled liquid; the absorber includes a plurality of vertical absorption channels downstream from the mixing section arranged to employ gravity to provide downward liquid flow with a density difference between liquid and vapour bubbles generating in counter flow to increase heat exchange contact between the liquid and vapour [with the liquid absorbing vapour as the flow proceeds, so the vapour bubble diameters become smaller and smaller in the liquid flow direction through the absorber enhancing the rate of heat and mass transfer, until saturated liquid with a very small vapour component reaches the absorber outlet].

A further feature of the invention provides for an AWG as defined in which the binary liquid-vapour mixture exiting the absorber outlet is a two-phase mixture with a density provided to have an amount of energy in latent vapour form sufficient to furnish the bubble reactor with the additional distillation heat.

Further features of the invention provide for an AWG as defined in which: the pressure on the second side of the water chiller evaporator is controlled above the bubble reactor pressure; the binary liquid-vapour mixture entering the water chiller evaporator is subcooled and then heated inside the water chiller evaporator to a saturation temperature.

Further features of the invention provide for an AWG as defined in which: the evaporator pump is connected to the bubble reactor to source and deliver to the water chiller evaporator a high concentration $NH_3$ binary liquid-vapour mixture at a temperature that is subcooled in relation to a pressure of the water chiller evaporator; cold, high concentration $NH_3$ binary liquid-vapour mixture from the bubble reactor is pumped via evaporator pump into the water chiller evaporator; the water chiller evaporator is a conventional shell and tube type heat exchanger where the water being chilled flows inside tubes and the high concentration NH3 binary liquid-vapour mixture flows inside a shell over the tubes.

Further features of the invention provide for an AWG as defined: which includes a starting device to produce vapour for heating the bubble reactor bottom; in which the starting device is a heating element in the water chiller evaporator provided to generate vapour.

Further features of the invention provide for an AWG as defined in which: the heating element is electrically operated; the heating element is heated using an external heat source; vapour generated by the heating element in the water chiller evaporator is injected into the absorber; vapour generated by the heating element in the water chiller evaporator is used to power an ejector connected to remove vapour from the bubble reactor and compress it and inject compressed vapour into the absorber where it is absorbed, generating heat into the subcooler chamber.

Further features of the invention provide for an AWG as defined in which: the starting device is an external electrically powered vacuum pump or compressor to remove vapour from the bubble reactor and compress it and inject compressed vapour into the absorber where it is absorbed, generating heat into the subcooler chamber; the starting device is a heating element in the subcooler chamber.

A further feature of the invention provides for an AWG as defined in which the evaporator pump and absorber circulation pump and a circulation water pump are integrated into a rotational system pump arrangement [using a pitot tube pump configuration].

A further feature of the invention provides for an AWG as defined which includes an integrated module provided to include a rotational absorber and bubble reactor with an integrated evaporator pump, absorber circulation pump, and a circulation water pump, the module coupled to the water chiller evaporator which is provided external to the module.

Further features of the invention provide for an AWG as defined in which: a start-up heating element is provided in the external water chiller evaporator; the operating pressure of the bubble reactor in the module is controlled by adjustment of a hot water outlet flow from the absorber and a pressure regulator is provided for adjusting the liquid pressure entering the external water chiller evaporator; a temperature controller is provided for regulating the mass flow of chilled water to a selected chilling temperature.

The invention extends to an associated method of generating water from ambient air based on the technology disclosed and referred to in this specification.

BRIEF DESCRIPTION OF THE DRAWINGS

These and other features of the invention will become more apparent from the following description of embodiments, made by way of example only, with reference to the accompanying drawings, in which.

DETAILED DESCRIPTION OF THE INVENTION

The atmospheric water generator (AWG) of the current invention provides for the de-humidification of air by chilling the air and employs an absorption heat transformer (AHT) that utilises ambient heat to power the process.

Figure 1:
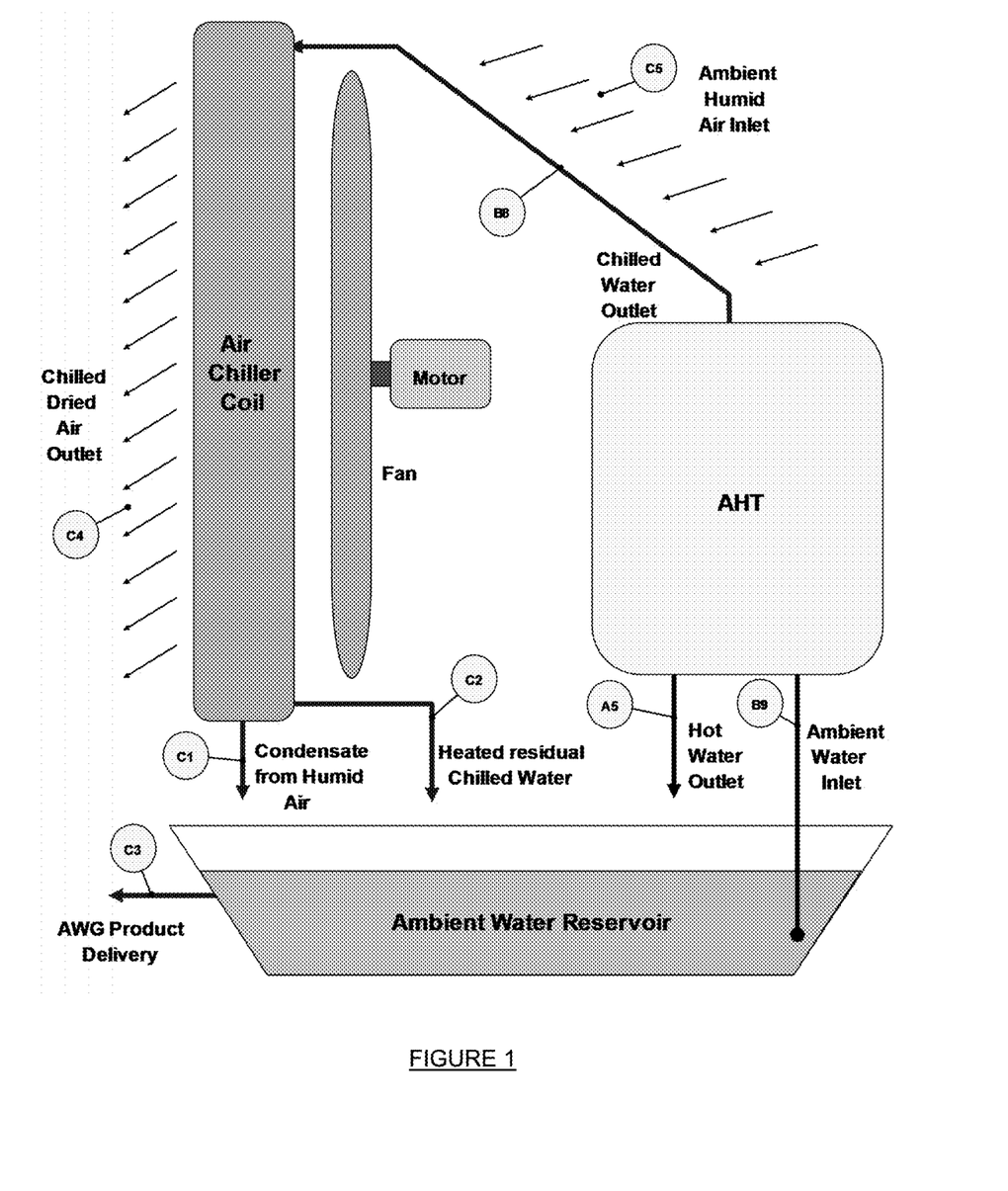
FIG. 1 shows schematic layout of an atmospheric water generator (AWG) in accordance with the invention.

Referring to FIG. 1 of the drawings, a process layout of the AWG in accordance with the invention is illustrated. The following features are labelled in FIG. 1, for reference on reading this description:
heated circulation water (CW) outlet (A5);
chilled CW leaving evaporator (B8);
ambient CW inlet to AHT (B9);
water condensed from humid air (C1);
remaining chilled water after H/E (C2);
AWG product produced (C3);
chilled dried air outlet (C4); and
ambient humid air inlet (C5).

The AHT includes a chilled water output (B8) directed to an air-water heat exchanger (H/E) that includes a de-humidifier or air chiller cold coil to condense water vapour from humid air.

The calculations and values in this specification are intended to provide estimations and an indication of the workable efficiencies of the equipment of the invention. The humidity assumed for calculations was chosen as 76%, which is the annual average humidity for Cape Town, South Africa. This gives a dew point temperature of 20.5° C.

The chilled water in the chiller H/E coil absorbs heat from the air and is slightly heated in this process. Both the chiller H/E coil outside which is channeled to an output conduit (C1) representing the condensate from the air and the coil inside which is channeled to a return conduit (C2) carrying the heated residual chilled water are directed to a water reservoir. The water so introduced to the reservoir would be in the region of or slightly above the stated dew point temperature.

Figure 2:
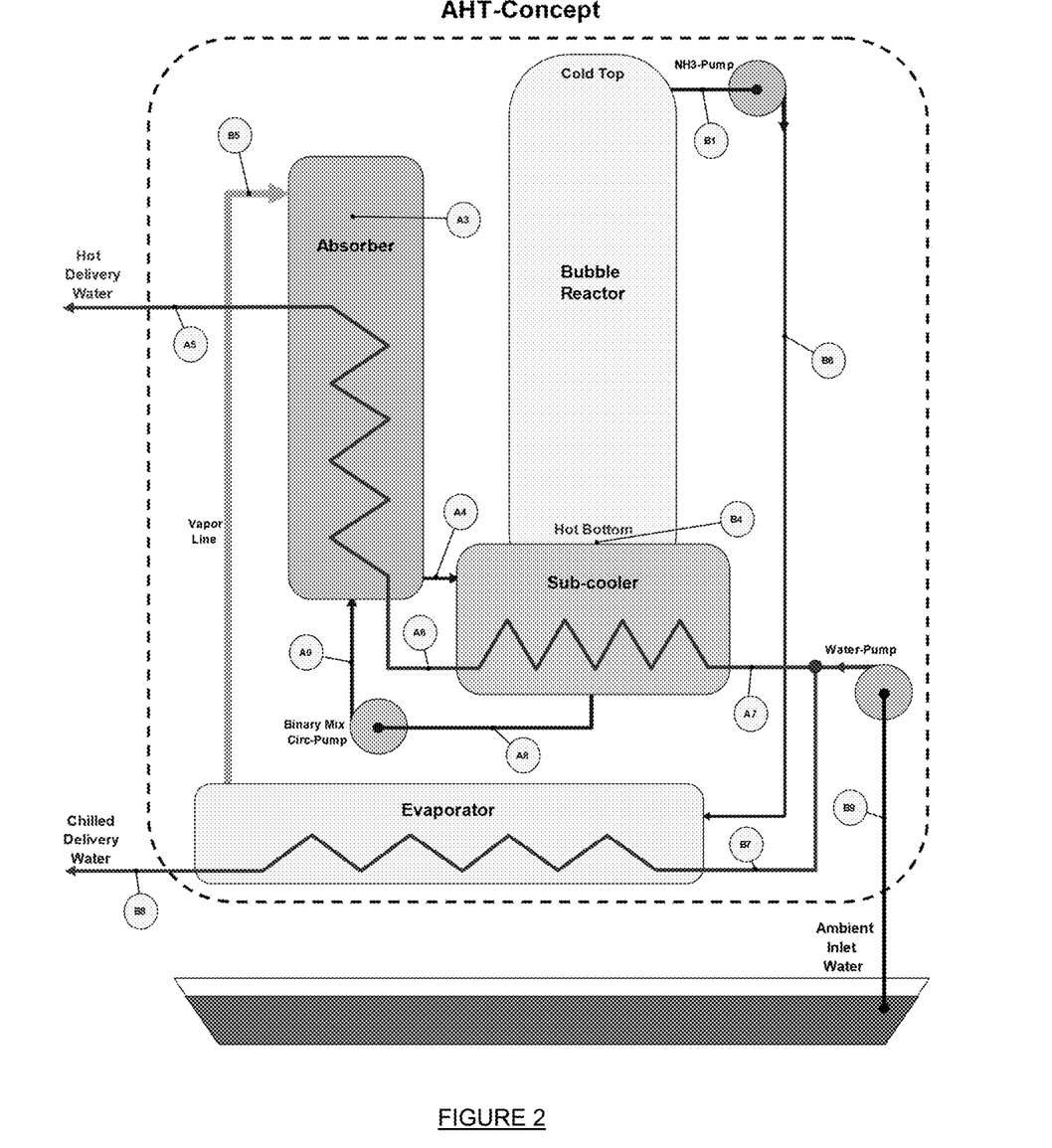
FIG. 2 shows the components of an absorption heat transformer (AHT) part of the AWG.

Referring also to FIG. 2, in accordance with the invention, the AWG incorporates the AHT which is configured as a heat pump to recover heat from the ambient water source, in this embodiment. The following features are labelled in FIG. 2 for reference on reading this description:
2-phase binary mixture after vapour injection (A3);
absorber outlet binary mixture (A4);
heated CW outlet (A5);
heated subcooler chamber CW outlet (A6);
ambient CW inlet to subcooler chamber (A7);
subcooled binary mixture pump inlet (A8);
subcooled circulation (circ) pump outlet (A9);
high concentration NH3 liquid outlet (B1);
vapour from evaporator to be absorbed (B5);
pumped high % NH3 liquid mixture (B6);
ambient CW inlet to evaporator (B7);
chilled CW leaving evaporator (B8); and
ambient CW inlet to AHT (B9).

The AHT consists of an evaporator, an absorber and a bubble reactor or distillation column. The evaporator serves as a water chiller heat exchanger (H/E). Liquid movement between the equipment of the AHT is generated by three pumps.

In this embodiment, the AHT makes use of a pseudo-isobaric temperature glide concept in an ammonia-water (NH3-H2O) binary mixture. The binary liquid-vapour mixture is contained in the heat exchanger distillation column. A different binary liquid-vapour mixture could also be used in variations of the invention.

Two process pumps operate with the binary NH3-H2O mixture as medium, namely:
A main process evaporator pump (or NH3-Pump); and
A binary mixture absorber circulation pump (or Circ-Pump).

The two process pumps which are in direct contact with the highly corrosive NH3-H2O binary medium should both be sealless or magnetic-driven to guarantee no rotating shaft is required to be sealed to keep the NH3 medium out of the environment.

The third pump is the circulation water (CW) pump (or Water-Pump). This water pump is not part of the closed thermodynamic cycle.

The AHT evaporator design in the current embodiment is such that the chilled water may be produced at a temperature as low as 2° C. In the result, the AWG will keep operating and produce water at (C3) even with very low humidity (for example less than 30% humidity) having dew point temperatures below 6° C. at the chosen ambient temperature of 25° C. The AWG machine output would obviously decrease in mass flow at such low humidity.

For the design of an AWG machine as shown in FIG. 1, an electric fan is included. The fan directs ambient air through a de-humidifying cold coil of the AWG machine. The cold coil chills the air until it reaches the dew point, after which water is condensed out of the air. De-humidified chilled air leaves the machine while the harvested water condensed out of the air is routed to the water reservoir.

The cold coil may have an increased heat exchange area formed by multiple fins covering tubes. The mass flow of the chilled water that moves through the chiller H/E coil determines the heat loading of the de-humidifier and can be throttled by an adjustable valve (not shown) to control the heat load. The ambient air may be pre-treated before it reaches the cold coil to facilitate water extraction.

The bubble reactor provides a direct contact heat exchanger (H/E) distillation column that works on the principle of the pseudo-isobaric temperature gliding. A binary zeotropic mixture column sealed into a gravitational field is employed with heat added to a bottom of the distillation column to boil off the more volatile component. In the current embodiment, an ammonia-water (NH3-H2O) binary liquid-vapour mixture is used with the NH3 being the volatile component.

The higher density, lower NH3 concentration binary mixture heats up and migrates to the bubble reactor bottom due to gravitational force acting on the component of higher density. The released volatile NH3 component, which is boiled off in vapour form, will be re-absorbed higher up in the bubble reactor, increasing the % NH3 concentration. The binary liquid-vapour mixture where the NH3 is re-absorbed has a lower two-phase mixture density, due to the higher NH3 concentration as well as vapour bubbles present, and forms a stream flowing to the bubble reactor top due to the lower density in the gravitational field.

This distillation (NH3 concentrating) process, where the mixture up-flow is powered by a vapour-lift reaction, is an endothermic process, absorbing heat from the mixture as it flows upwards in the gravitational force field. The endothermic NH3 flow process in the upwards direction concentrates the NH3, and cools down the mixture, creating a cold, high % NH3 column top.

When NH3 dissolves in H2O, the dilution process is exothermic heating the mixture, opposite to the distillation process. In the upwards flowing NH3 concentration process, vapour bubbles are gradually absorbed, generating heat to release more NH3 vapour bubbles going upwards, and the higher temperature, lower % NH3 liquid with higher density is forced downwards by gravity. The low concentration NH3, heated liquid stream increases in mass and temperature as it flows downwards, also forming a hot stream in direct contact with the colder, two-phase, low density upward flowing stream, and therefore heat is exchanged in this direct contact counter flow dual stream "heat exchanger" along the length of the bubble reactor.

The temperature gradient (hot area in the bottom and cold area at the top) in the bubble reactor, at substantially constant pressure (nearly isobaric) and remaining saturated throughout the bubble reactor, accompanied by a NH3 concentration gradient (high % NH3 at the top and low % NH3 at the bottom) provides the pseudo-isobaric temperature glide.

Even when no heat is added, with the flows stagnating, the gradients set up in the bubble reactor will dissipate extremely slowly, by radiant and conduction heat loss only, as convection (that we are used to in pure liquids like water) is inhibited while the column stays in the gravitational force field. Density differences between the bottom and the top will tend to maintain the gradients that have been set up.

In a column that is not completely sealed, but with mass flow forced into the column bottom and removed from the column top, the process stays (substantially) identical to what was already described, as long as the column diameter is large enough (for example, maintaining an average void fraction of some 20%) to allow sufficient vertical flow space and not hamper the two counter flow liquid streams.

In the bubble reactor, the saturated liquid density is highest at the bottom (B4) and decreases nearly linearly with height to the lowest density at the top. In all areas of the bubble reactor, the binary liquid-vapour mixture is at the saturation temperature corresponding to the isobaric column pressure.

Figure 3:
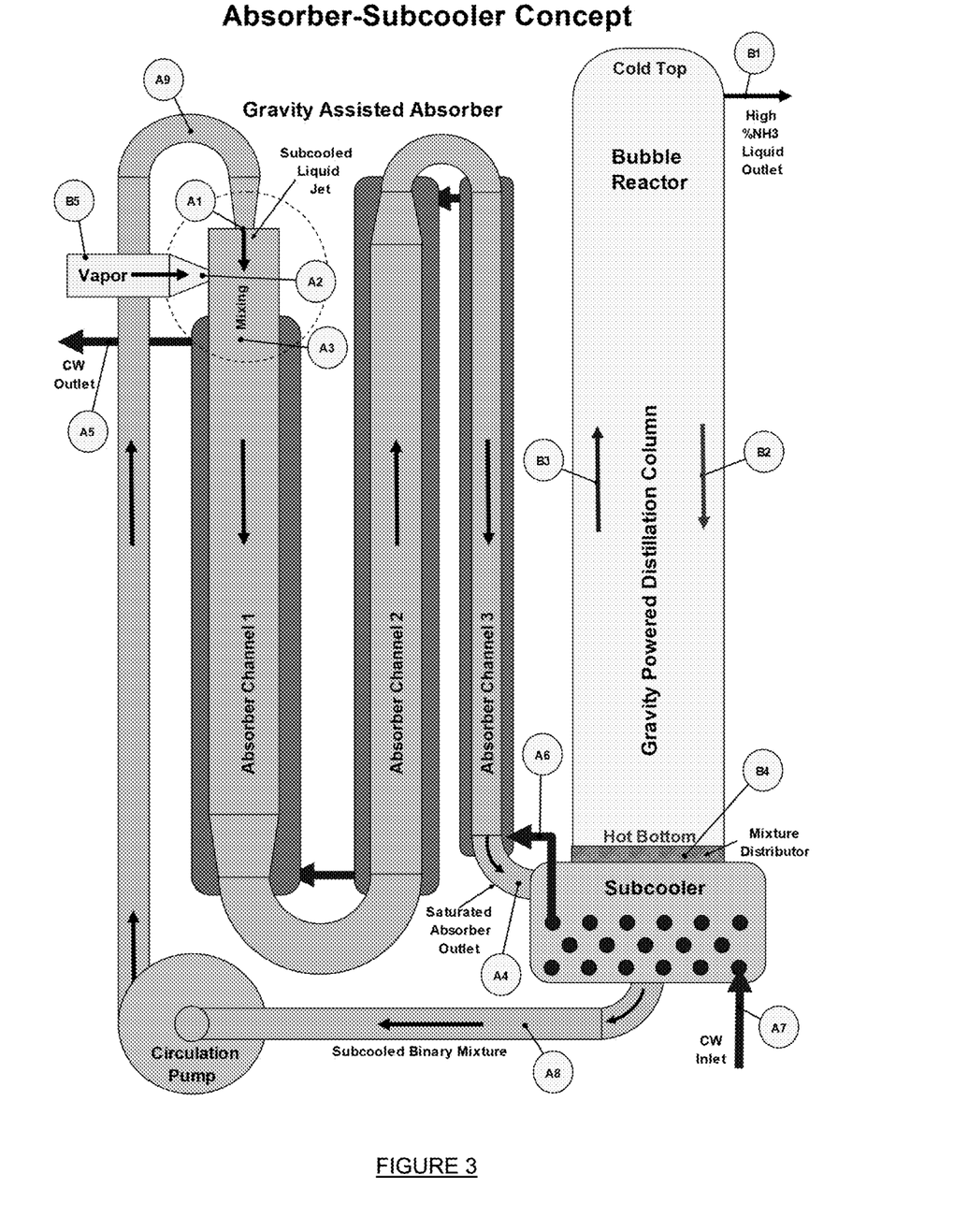
FIG. 3 shows the components of a subcooler and absorber of the AHT.

Referring also to FIG. 3, in accordance with the invention, the AHT incorporates a subcooler chamber which is connected to the absorber. The following features and references are labelled in FIG. 3, for reference on reading this description:

subcooled binary mixture jet (A1);
vapour inflow jet (A2);
2-phase binary mixture after vapour injection (A3);
absorber outlet binary mixture (A4);
heated CW outlet (A5);
heated subcooler chamber CW outlet (A6);
ambient CW inlet to subcooler chamber (A7);
subcooled binary mixture pump inlet (A8);
subcooled (circ) pump outlet (A9);
high concentration NH3 liquid outlet (B1);
heated low % NH3 liquid downflow (B2);
vapour lift high % NH3 2-phase upflow (B3);
bubble reactor 2-phase mixture inlet (B4); and
vapour from evaporator to be absorbed (B5).

A subcooler chamber is provided below the bubble reactor. The binary liquid-vapour mixture in the subcooler chamber is in contact with a cooling coil, where heat is removed from the mixture. Water from the reservoir is pumped from (A7) to (A6) through the cooling coil. The cooling, with the NH3 concentration (substantially) constant, leads to subcooling with the binary liquid-vapour mixture temperature dropping below the saturation level for the pressure in the bubble reactor.

At the top of the subcooler chamber, where the binary liquid-vapour mixture is still saturated at (A4), the temperature is about 60° C. but due to the cooling, the subcooler chamber outlet temperature at (A8) drops to about 45° C., which represents a cooling effect of some 15° C.

The binary mixture liquid density at the subcooler chamber top with a temperature of 60° C. is about 985 kg/m3, while the subcooled mixture exit at (A8) has a liquid density of about 995 kg/m3 at 45° C. The colder liquid descends to the subcooler chamber bottom where the absorber Circ-Pump suction inlet draws liquid.

The absorber Circ-Pump inlet at (A8) is at the bubble reactor pressure of 2.8 Bar Abs and this pump increases the pressure to 3.09 Bar Abs at position (A9) from where the subcooled liquid is forced through a nozzle to drop the dynamic pressure in a subcooled liquid jet entering a mixing section of the absorber. Vapour from the evaporator also enters the mixing section via a vapour nozzle and mixes with the highly turbulent, subcooled liquid jet to form a thoroughly mixed two-phase vapour-liquid flow column exchanging heat and mass as the vapour is absorbed in the subcooled liquid. This is shown most clearly in FIG. 3.

FIG. 3 also shows three vertical absorption channels in the absorber downstream from the mixing section. The absorption channels 1, 2 and 3 are arranged to employ gravity to provide downward liquid flow. The vapour density difference to the liquid attempts to force the vapour bubbles upwards in counter flow to the liquid under gravity. The overall effect is to keep the vapour in H/E contact with the liquid for a longer time, absorbing vapour as the flow proceeds, so the vapour bubble diameters become smaller and smaller in the liquid flow direction through the absorber. This enhances the rate of heat and mass transfer further, until saturated liquid with a very small vapour component reaches the absorber outlet at (A4).

As the absorber outlet is still a two-phase mixture, the density of the mixture calculates, in the current embodiment, to about 210 kg/m3, carrying just the correct amount of energy in latent vapour form to furnish the bubble reactor with the additional distillation heat of 8.09 kW required.

The complete absorber-bubble reactor combination is in pressure balance, so any additional heat present in the absorber outflow at (A4) will generate too much vapour, forcing more than the required 8.09 kW into the bubble reactor and increasing the bubble reactor pressure. To remove this additional heat in order to drop the pressure back to the design point, additional cooling is required.

The water that exits the cooling coil in the subcooler at (A6) enters an absorber coil in the absorber and exits the absorber as hot delivery water at (A5). The water mass flow rate from the circulation water pump is used to control the reactor pressure to design point.

The absorption process in the absorber, where vapour is in contact with the subcooled binary liquid and being absorbed, not only generates heat, but also pressure, as the mass of NH3 vapour being absorbed increases the liquid NH3 concentration. The higher NH3 concentration has a higher saturation pressure, so local pressure is easily increased at the absorption point. It is therefore important that the liquid should be subcooled, so absorption heat may be used to increase the liquid temperature from the subcooled to the saturation temperature, instead of building pressure. Also, absorption heat should be removed from the vapour-liquid contact interface as soon as possible. For this reason, high liquid velocity is used to generate turbulence.

The rate of heat absorption in the absorber is related to:
 H/E area, calculated as surface area of the vapour bubbles (and number of bubbles) and the bubble diameters in the mixture;
 The rate of heat removal from the vapour-liquid interface brought by turbulence and high velocity of the liquid flow;
 The relative frictional movement (shear force) of the lower density vapour bubble stream to the higher density liquid stream creating turbulence, also responsible for breaking up vapour bubbles into smaller bubbles, generated by a force field that may include gravity and/or centrifugal force; and/or
 The degree of subcooling in the liquid flow. Higher subcooling generates higher rates of heat transfer without raising the local pressure.

The absorber design may be modified to enhance the rate of H/E substantially by using the chemical process intensifiers. Keeping all other parameters equal, a change in vapour bubble diameter in a vapour-liquid contact device (like the bubble reactor and the absorber columns) can have a significant effect on the volumetric rate of heat exchange. The effect of increasing the force field from standard gravity of 1 G to a force of 10 G, for example, with all other parameters kept equal, will also provide for a significant rate of H/E increase.

Mass-, heat-, and species balance calculations across the complete absorber, balance the pressure-, kinetic-, and enthalpy components of both liquid and vapour phases, as well as external heat removal by the circulation water jacket in the two-phase flow, from the inlet (mixing) area at (A3) to the final output at (A4). In the result, the subcooling requirement of 15° C. (saturated temperature of 60° C. to subcooled temperature of 45° C.) is provided to achieve the correct output pressure at (A4) corresponding to the saturation pressure of the saturated mixture at (B4).

Liquid from the cold, high concentration NH3 at the bubble reactor top is withdrawn at (B1) and pumped via an NH3-Pump (or evaporator pump) into the evaporator. In this embodiment, the evaporator pressure is controlled at 1.5 Bar above the bubble reactor pressure by a liquid pressure regulator set at 4.3 Bar Abs.

The design point temperature at the evaporator inlet is −10.3° C. at the pressure regulator output, but due to the NH3-Pump action, the liquid is subcooled entering the evaporator at (B6). Being heated inside the evaporator, it reaches the saturation temperature of close to 1° C. (chosen in design so water being chilled inside the evaporator never reaches freezing conditions) and starts evaporating. As more and more NH3 in vapour form is boiled off inside the evaporator, the remaining NH3 concentration in the liquid is decreasing, with the corresponding increase in saturation temperature, up to the final vapour output (B5) where 90% (or more) of the liquid is vaporised and the output two-phase vapour stream is at a temperature of 15° C.

Controlling the evaporator pressure therefore serves to provide that heat of evaporation is extracted in the evaporator in the range 15° C. to 1° C., with ambient water flowing through the evaporator from (B7) at 25° C. to the chilled output of 2° C. at (B8).

The mass flow of ambient water through the evaporator is high enough so that 48.9 kW of heat is extracted from the water. Of this heat, some 41 kW is delivered as hot water at position (A5) at a temperature of 55° C., while the balance of 8.09 kW is used for the binary liquid-vapour mixture distillation process.

A calculation based on these figures provides a real thermodynamic coefficient of performance as heat pump of COP=0.83, but with the three liquid pumps together only consuming 240 Watt, the performance calculation parameters, COPe for cooling service=204 and the COPe for heating service=171. The calculation is considered to be fairly conservative, using the average pump efficiency of only 20%, but should different types of pumps (such as Pitot tube pumps, for example) be used the efficiency may be increased to about 50%, making the total electricity consumption only 96 Watt. The performance figures (COPe)

would then look quite different, namely COPe for cooling service=509 and the COPe for heating service=427.

The AHT is described above in its active, operational state. When not in use, the components of the NH3-H2O binary mixture sealed into the machine will distribute throughout the piping and tanks and would eventually be of (substantially) uniform concentration everywhere at ambient temperature.

To get the binary liquid-vapour mixture into the "active" state, energy must be added to the absorber-bubble reactor combination, to introduce the temperature gradient in the bubble reactor column.

This AHT is considered to be active when:
(a) the bubble reactor top is at the design temperature (−10° C.);
(b) the subcooler chamber, where it joins the bubble reactor, is at the design high temperature value (60° C.); and
(c) all three pumps are in operation.

Should the system be designed for extracting heat from a source at higher temperature than ambient, starting of the pumps would gradually increase the gradients in the bubble reactor as the higher temperature waste heat circulating through the evaporator would generate vapour, starting the process.

Where the design is for heat to be extracted from a heat source at, or even below ambient temperature, starting the pumps will not start the system, as no vapour would be produced in the evaporator. Some means or apparatus should be used to start the process and produce vapour for heating the reactor bottom. Several different methods and apparatus may be utilised as starting devices, for example:

1. Use an external electrically powered vacuum pump/compressor to remove vapour from the bubble reactor top and compress it into the absorber inlet. Vapour removal from the bubble reactor top would drop the pressure and flash off some NH3 vapour, removing latent heat of liquid vaporising from the bubble reactor top and cool it down. Simultaneously, the compressed vapour injected into the absorber would be absorbed, generating heat into the subcooler chamber. Once design point temperatures at the correct bubble reactor pressure have been reached, the vacuum pump is simply switched off, as heat extracted in the evaporator in normal operation would maintain the design gradient conditions further.

2. Provide a heating element into the evaporator, to generate vapour electrically (or by some external heat source), for starting purposes. This would probably be the best starting device, as the external heat source for starting may even be a low temperature waste heat source, as long as it is a higher temperature by some 10° C. minimum above the saturation temperature of the binary liquid-vapour mixture at the evaporator controlled pressure of 3.3 Bar (G). Starting higher pressure in the bubble reactor may limit the speed of starting, though, as during the initial starting stage with the subcooler chamber and circulation water (CW) both at the same temperature, no heat will be removed from the subcooler chamber, with the resultant lack of bubble reactor pressure control. Using a reasonable bubble reactor pressure overshoot capability in the design should make this starting device, being an adjustable electrical heating element, the cheapest practical starting device. Limiting the heat input by choosing a small enough heating element would also resolve pressure overshoot issues.

3. To avoid the mentioned overpressure reaction on the bubble reactor vessel during start-up, the heating element in the evaporator may generate vapour, but instead of injecting it direct into the absorber, for starting it may be routed to and used to power an ejector that would do the same function as the first mentioned vacuum pump, just a lot cheaper.

4. Provide a heating element into the subcooler chamber that can be switched on for starting. Initial starting of all three pumps would not start the AHT, as no vapour is generated anywhere. Heating the subcooler chamber will drive NH3 to the bubble reactor top, creating the higher concentration NH3 required in the pumped liquid for the evaporator to generate vapour from, as the pressure is kept constant. This would take a lot longer for achieving "active" conditions in the bubble reactor though, and there is a risk of too much heat added, with the result that the bubble reactor pressure rise dangerously high.

Activation of the bubble reactor (Start-up), using method 2 would typically proceed as follows:

Initially binary liquid-vapour mixture, at (design value) 50% NH3 concentration throughout the complete system, and therefore also in the evaporator, at the constant pressure controlled at 3.3 Bar (G), has a saturation temperature of 34.32° C. The start-up heater is switched on, generating vapour at this saturation temperature. This vapour, being absorbed in the absorber, increases the mixture temperature, concentrating NH3 in the bubble reactor with the highest concentration at the bubble reactor top. This higher concentration NH3 liquid at the pump suction point, is pumped into the evaporator.

Assuming the mixture, now at eg. 55% NH3, saturation temperature drop to 27.21° C. for vapour generation at saturation temperature. The absorption heating process and NH3 distillation at the bubble reactor top now deliver eg. 60% NH3 to the pump.

As the evaporator mixture gradually increase in % NH3 to 60%, with saturation temperature dropping to 21.05° C., generating vapour at this lower temperature.

With time, the mixture concentration in the evaporator increases gradually, dropping the saturation temperature gradually. When the concentration reach 75% NH3, the saturation temperature have dropped to 8.13° C., still at the controlled pressure of 3.3 Bar (G), lower than ambient temperature by a large margin, allowing the ambient circulation water at the higher temperature constantly being pumped through the evaporator, to take over the vapour generation function done by the starting heater. At this stage the starting heater may be switched off, as normal AHT operation would take over. Design point conditions will be reached in the bubble reactor in time.

Replacing or supplementing the gravitational force field needed by both the absorber and the bubble reactor described above with a centrifugal force field would have advantages in efficiency that allow for use of reduced vessel sizes.

Physical dimensions of the H/E equipment depend directly on the rate of heat exchange achievable in the flow fields. Although this rate is high as a result of the direct contact nature of the vapour-liquid mixtures, the use of helical tubes or rotational channels may provide H/E rates that are 2-3 times as high, due to both centrifugal (buoyancy) and Coriolis forces in rotational systems. This enhancement would allow physical H/E channels and containers to be up to half the size of the gravitational equivalent machines.

The pumps required by the standard gravitational system (as described above) generally have very low thermodynamic efficiencies. One example for an NH3-Pump would be a sliding vane, magnetic coupled sealless pump, but the isentropic efficiency is only 15%. Similarly, an absorber Circ-Pump, of centrifugal design with sealless rotor construction, may render an efficiency of only 18%. These separate pumps may easily be integrated into the rotational system by using the pitot tube pump principles. The use of a pitot tube pump, ideally suited to low flow, high pressure applications, may improve isentropic efficiencies to about 50%-65%. Operation curve of these type of pumps are generally very flat, with very little change in pump efficiency when flow is increased from 0% to 100%. Integrating these pumps (together with a circulation water pump and internal oil pump) also does away with the need for a magnetic coupling, making the integrated combination smaller, cheaper and driven by a single external electrical motor. The fixed rotational speed would be designed to suit the physical installation and may be as high as 1000-1500 RPM on very small machines, while larger machines would see much lower rotational speeds, for example 100-300 RPM.

Figure 4:
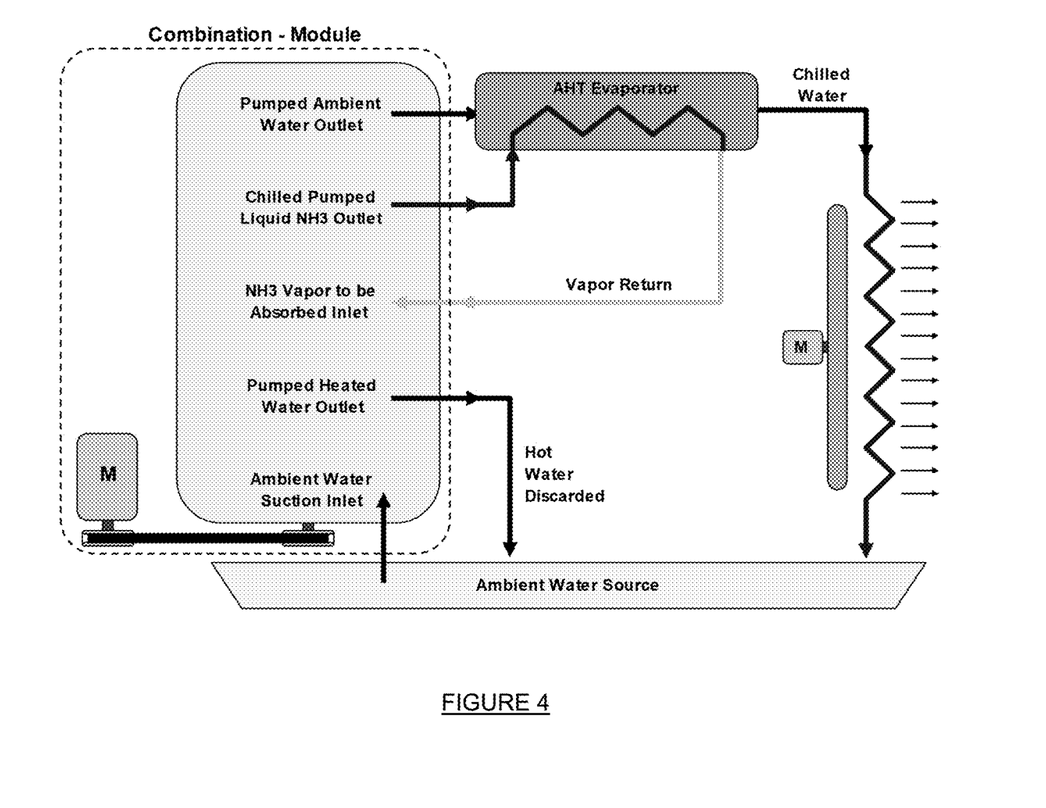
FIG. 4 shows an alternative embodiment of AWG.

Referring to the drawing of FIG. 4, an integrated module is provided to include a rotational (or rolled up) absorber and bubble reactor with an integrated NH3-Pump, absorber Circ-Pump, and a water pump, combined with its own internal oil pump feeding the bearings and seals. The illustrated module would scale with relative ease from a few kW operation to as much as a few MW.

The system utilizing this combination module provides for a simplified configuration with the advantage of enclosing all the NH3-H2O process equipment within a suitably sealed housing of the module. A complete AHT will be made up of one of these combination modules coupled with an external evaporator.

System starting (i.e. activating the pseudo-isobaric temperature glide) in this embodiment will be achieved by adding a start-up heating element in the external evaporator. Internally, within the module, the reactor operating pressure is controlled by adjustment of the hot water outlet flow, circulating internally through cooling channels. The only external control required will involve a pressure regulator for adjusting the liquid pressure entering the external evaporator, as the vapour return line carries both vapour and liquid (in suspension) back to the module. A temperature controller for regulating the mass flow of chilled water to a specific chilling temperature, for example, 2° C. would complete the AHT layout.

The modular AHT design, has the advantages of construction, NH3 filling and commissioning of the module in a factory environment, where a test bench with numerous testing gauges may be coupled to the normally sealed off test lines via flexible bundle of small-diameter PTFE tubing for commissioning purposes. Using the module on a user's site involves no NH3 work (if the evaporator is also coupled in the factory). The user will not require access to the equipment contents on the inside of the module.

The AWG of the invention includes an AHT designed as a practical heat pump that is able to extract heat even from waste heat sources at or below ambient temperatures, with an evaporator working at a favourable design temperature (preferably between 2° C. and 15° C.).

The AHT uses ambient heat to power the de-humidifying process instead of the much more expensive electricity utilised by a conventional chiller unit or VC heat pump. Heat energy for powering the AHT is extracted from the low temperature side and in AWG operation it literally draws heat out of the air to power the machine. The energy comes from the latent heat of condensation at the dew-point temperature of water vapour, present as humidity in the atmospheric air. Energy required to chill the air down to the dew point is recovered when the chilled, dried air is used as coolant to drop the atmospheric ambient humid air temperature down to dew point.

Combining the water chilling capability of the AHT with the AWG optimises the water production with decreased electricity consumption as well as providing a lower chilling temperature for AWG operation even at very low humidity with dew points as low as 3-4° C. The electricity used for liquid pumping is generally a few orders of magnitude smaller than vapour compression.

The invention provides a low-cost heat pump device as AHT for generating both heat and cold from the ambient heat energy available and employs the refrigeration effects to drive an AWG process.

The chilled and/or heated water may also be used for other applications, such as air conditioning and refrigeration systems or hot water systems. The use of the AHT to pump heat in such applications may produce significantly more output for the same electricity used. With a substantial amount of all global electricity generated being used for refrigeration and air conditioning, the significance of the invention presents far reaching benefits.

The AWG of the invention reduces water production costs in energy terms to an environmentally and commercially beneficial value. It can therefore compete well with municipal water rates and desalination technologies.

A person skilled in the art will appreciate that a number of variations may be made to the features of the currently described embodiment without departing from the scope of the invention.

The invention claimed is:

1. An atmospheric water generator (AWG) that includes: a cold coil for extraction of atmospheric water from air; a pseudo-isobaric temperature glide bubble reactor that contains a suitable binary liquid-vapour mixture in a density separation distillation environment, powered by a vapour absorption process; a source of water that is connected to an water chiller evaporator with a water chilling flow path on a first side of the water chiller evaporator that is isolated from and in thermal communication with a second side of the water chiller evaporator; a binary liquid-vapour mixture supply line from the bubble reactor connected through an evaporator pump to the second side of the water chiller evaporator for evaporation of the binary liquid-vapour mixture and thermal energy extraction from the water in the water chilling flow path; the water chilling flow path connected from the water chiller evaporator to the cold coil; and a binary liquid-vapour mixture return line from the second side of the water chiller evaporator connected to an absorber with a binary liquid-vapour mixture outlet connected back into the bubble reactor.

2. The AWG as claimed in claim 1, in which the binary liquid-vapour mixture return line from the second side of the water chiller evaporator is connected through a first inlet to the absorber and the bubble reactor is connected through an absorber circulation pump into a second inlet of the absorber.

3. The AWG as claimed in claim 2, in which the bubble reactor includes a subcooler chamber provided below the bubble reactor with binary liquid-vapour mixture in the subcooler chamber in contact with a cooling coil for heat removal and subcooling of the binary liquid-vapour mixture.

4. The AWG as claimed in claim 3, in which water is pumped through the cooling coil of the subcooler chamber and from the cooling coil to an absorber coil in the absorber to exit the absorber as hot delivery water.

5. The AWG as claimed in claim 4, in which a subcooled liquid component of the binary liquid-vapour mixture descends to a bottom of the subcooler chamber where a suction inlet of the absorber circulation pump draws subcooled liquid.

6. The AWG as claimed in claim 5, in which subcooled liquid from the absorber circulation pump enters a mixing section of the absorber through a nozzle at the second inlet and vapour from the water chiller evaporator enters the mixing section through a vapour nozzle at the first inlet to form a mixed two-phase liquid-vapour flow column exchanging heat and mass as the vapour is absorbed in the subcooled liquid.

7. The AWG as claimed in claim 6, in which the absorber includes a plurality of vertical absorption channels downstream from the mixing section arranged to employ gravity to provide downward liquid flow with a density difference between liquid and vapour bubbles generating in counter flow to increase heat exchange contact between the liquid and vapour.

8. The AWG as claimed in claim 2, in which the pressure on the second side of the water chiller evaporator is controlled above the bubble reactor pressure.

9. The AWG as claimed in claim 8, in which the binary liquid-vapour mixture entering the water chiller evaporator is subcooled and then heated inside the water chiller evaporator to a saturation temperature.

10. The AWG as claimed in claim 1, in which the density separation distillation in the bubble reactor is provided by: (a) gravitational force; (b) centrifugal forces generated in the binary liquid-vapour mixture; or (c) a combination of gravitational force and centrifugal forces generated in the binary liquid-vapour mixture.

11. The AWG as claimed in claim 1, in which a fan is arranged to move air from an ambient environment over the cold coil.

12. The AWG as claimed in claim 1, in which the binary liquid-vapour mixture is an ammonia-water ($NH_3$-$H_2O$) mixture.

13. The AWG as claimed in claim 1, in which the water source is a water reservoir connected through a circulation water pump to the water chilling flow path on a first side of the water chiller evaporator.

14. The AWG as claimed in claim 13, in which the evaporator pump and absorber circulation pump and a circulation water pump are integrated into a rotational system pump arrangement.

15. The AWG as claimed in claim 13, which includes an integrated module provided to include a rotational absorber and bubble reactor with an integrated evaporator pump, absorber circulation pump, and a circulation water pump, the module coupled to the water chiller evaporator which is provided external to the module.

16. The AWG as claimed in claim 1, which includes a starting device to produce vapour for heating the bubble reactor bottom.

17. The AWG as claimed in claim 16, in which the starting device is a heating element in the water chiller evaporator provided to generate vapour.

\* \* \* \* \*